Sept. 17, 1957     T. C. MASCARO     2,806,710
TRAILER HAVING VERTICALLY ADJUSTABLE WHEELS AND HITCH
Filed Dec. 30, 1955     3 Sheets-Sheet 1
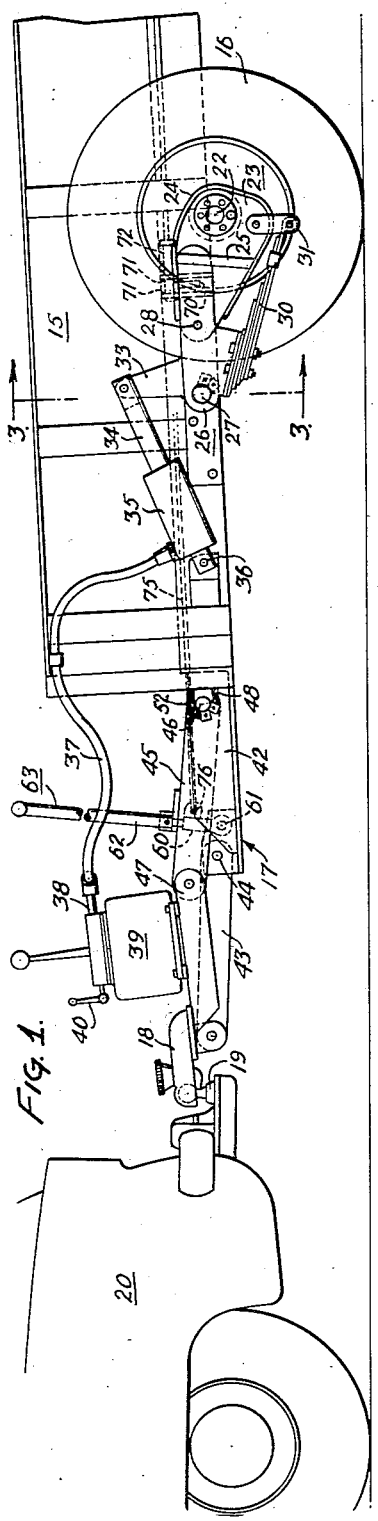
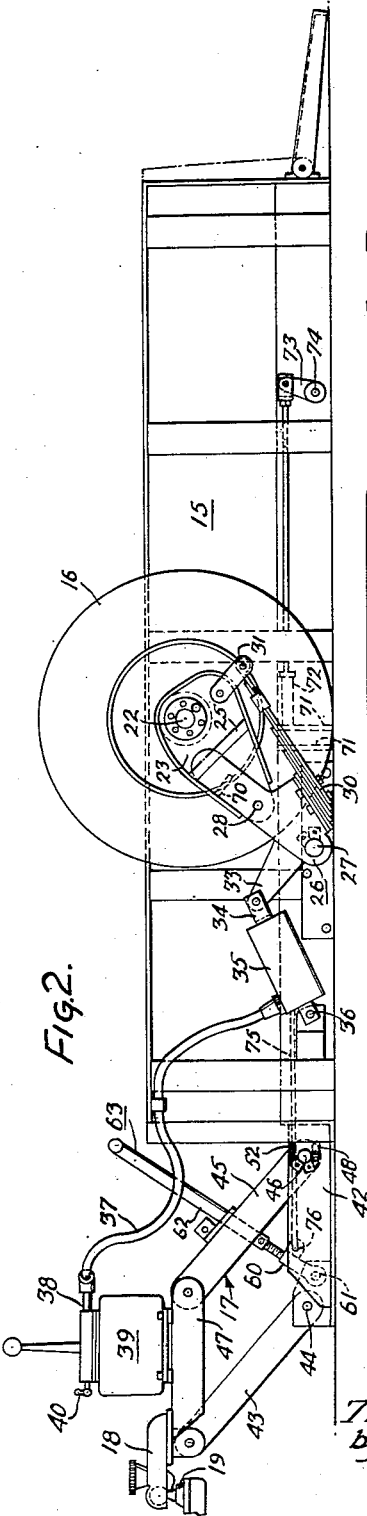
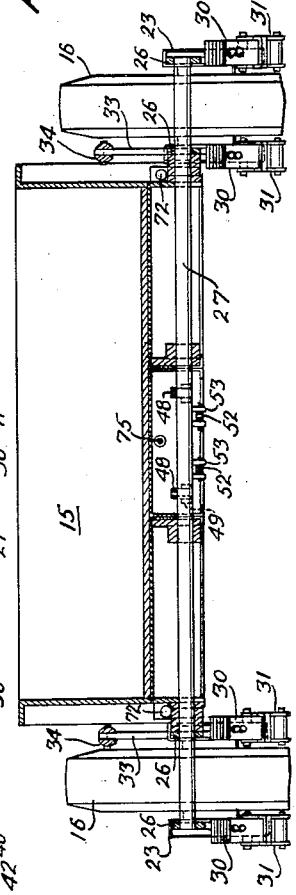
Inventor:
Thomas C. Mascaro
by Howson & Howson
Attys.

Sept. 17, 1957      T. C. MASCARO      2,806,710
TRAILER HAVING VERTICALLY ADJUSTABLE WHEELS AND HITCH
Filed Dec. 30, 1955      3 Sheets-Sheet 2
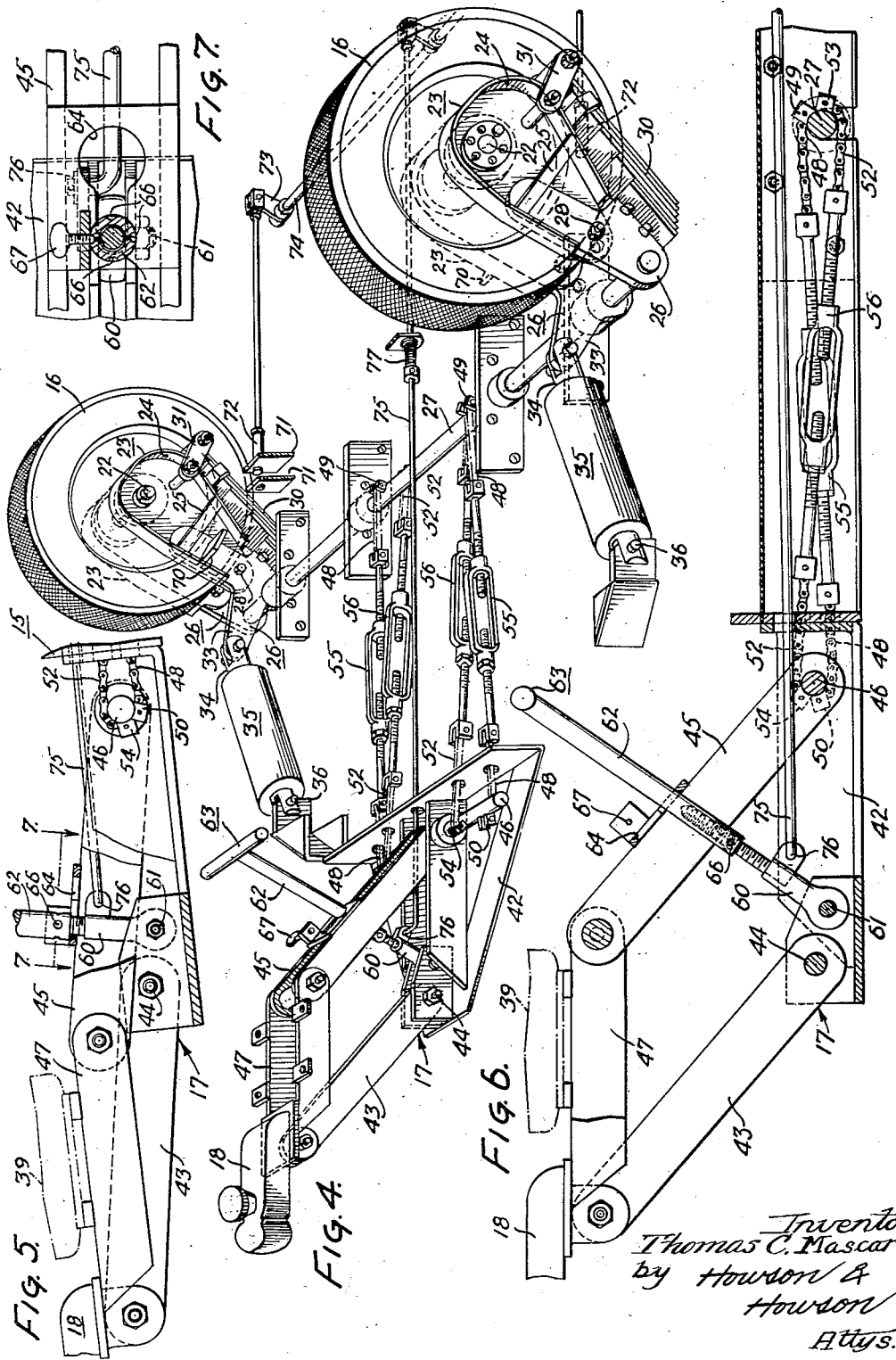

Sept. 17, 1957 T. C. MASCARO 2,806,710
TRAILER HAVING VERTICALLY ADJUSTABLE WHEELS AND HITCH
Filed Dec. 30, 1955 3 Sheets-Sheet 3
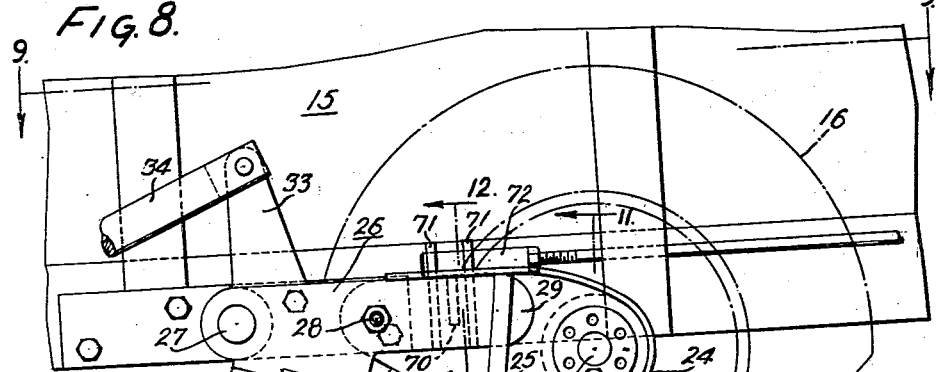
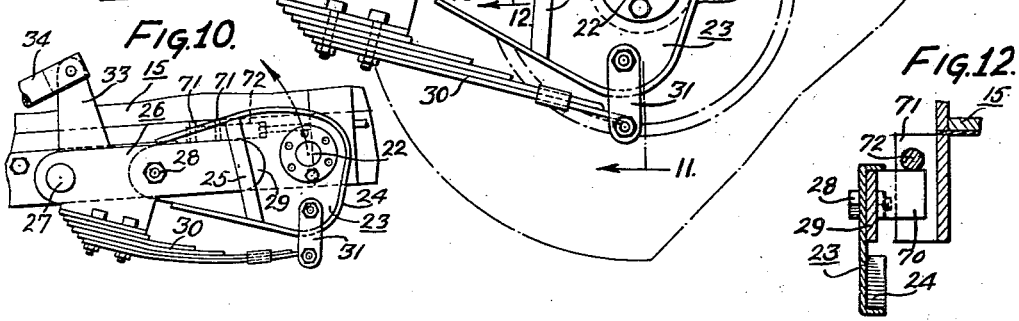
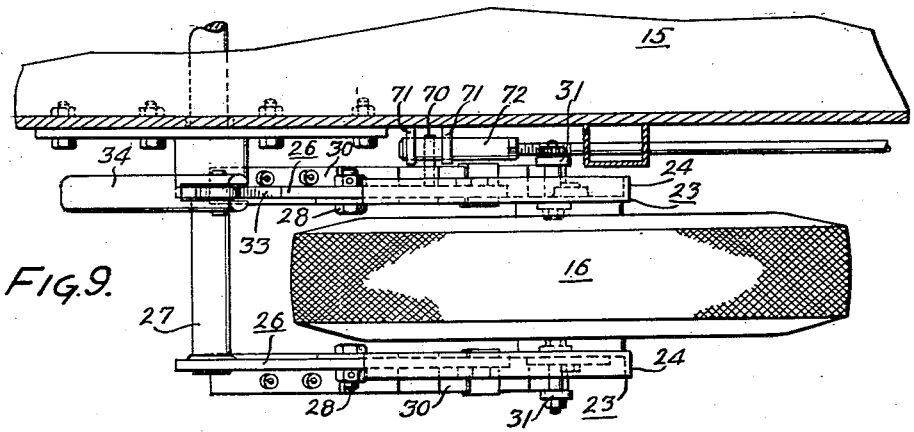
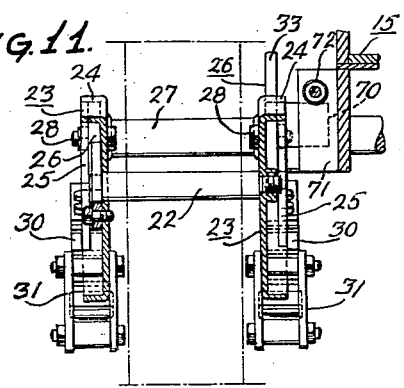
Inventor:
Thomas C. Mascaro
by Howson & Howson
Attys.

United States Patent Office 2,806,710
Patented Sept. 17, 1957

2,806,710

TRAILER HAVING VERTICALLY ADJUSTABLE WHEELS AND HITCH

Thomas C. Mascaro, West Point, Pa.

Application December 30, 1955, Serial No. 556,665

10 Claims. (Cl. 280—44)

The present invention relates to trailers, and more particularly to a semi-trailer in which the forward end is supported by the towing vehicle. The invention has particular utility in trailers for hauling animals, heavy equipment and the like, which are adapted to be towed by automotive vehicles.

The conventional trailer of this type consists of a trailer body having a rigid draw bar at its forward end for connection to the towing vehicle, and a pair of supporting wheels adjacent its rearward end. The conventional trailer is difficult to load since the load must be elevated above the axle of the wheels, in order to place the load in the body of the trailer. This requires special hoisting equipment when handling heavy equipment and the like, or requires the use of loading platforms or ramps.

With the foregoing in mind, the present invention contemplates a trailer having collapsible wheels, and an articulated draw bar which enables the body of the trailer to be normally positioned above the axle of the wheels to provide sufficient road clearance, and yet susceptible of being positioned flush on the ground for loading and unloading. The wheel mounting means and the draw bar are interconnected to maintain the body of the trailer horizontal at all times.

The invention provides a trailer which is of simple manufacture, and which is capable of being locked in raised position.

All of the objects, and the various features and details of the construction and operation of the invention are more fully set forth hereinafter with reference to the accompanying drawings in which:

Fig. 1 is a side elevational view of a trailer made in accordance with the present invention in elevated position;

Fig. 2 is a side elevational view of the trailer shown in Fig. 1 in lowered position;

Fig. 3 is a transverse sectional view taken on the line 3—3 of Fig. 1;

Fig. 4 is a perspective view of the trailer in the lowered position, with the trailer body removed;

Fig. 5 is an enlarged side elevational view of the articulated draw bar in the elevated position with portions broken away to more clearly illustrate the construction;

Fig. 6 is an enlarged longitudinal sectional view of the draw bar and the connections to the wheels in the lowered position;

Fig. 7 is a fragmentary sectional view taken on the line 7—7 of Fig. 5;

Fig. 8 is an enlarged side elevational view of the wheel mounting means in the elevated position;

Fig. 9 is a sectional view taken on the line 9—9 of Fig. 8;

Fig. 10 is a fragmentary side elevational view at a reduced scale similar to Fig. 8 and illustrating the resilient mounting of the wheel journals;

Fig. 11 is a transverse sectional view taken on the line 11—11 of Fig. 8; and,

Fig. 12 is a transverse sectional view taken on the line 12—12 of Fig. 8.

Referring now to the drawings, the trailer comprises a body portion 15 supported by wheels 16, 16 journalled at opposite sides of the body portion 15, as more fully described hereinafter. An articulated draw bar 17 is mounted on the forward end of the body 15 and is provided with a suitable connector 18 for engaging a conventional trailer hitch 19 of the towing vehicle indicated at 20.

Means is provided to raise and lower the wheels 16, 16 relative to the trailer body 15 between upper and lower limit positions shown respectively in Figs. 1 and 2 respectively. Each wheel 16 is rotatably mounted on a stub axle 22 which spans between a pair of journal plates 23, 23. Each journal plate 23 is provided with an outturned peripheral flange 24. A reinforcing strut 25 spans between the outer extremities of the flange 24, as clearly shown in Figs. 4 and 8.

Each journal plate 23 is pivotally mounted as indicated at 28 on a crank lever 26 which is rigidly secured to a transversely extending axle shaft 27. The pivot point 28 mounting the journal plate 23 is disposed centrally of the lever, thereby providing a free extension 29 which engages normally against the under surface of the uppermost portion of the flange 24 and within the strut 25. A leaf spring 30 is rigidly mounted at one end to the lever 26, and is pivotally mounted at the other end as indicated at 31 to the journal plate 23 to bias the plate 23 downwardly to engage the crank lever extension 29 firmly against the upper portion of the flange 24 when the trailer is without load. The spring 30 provides a resilient suspension for the wheel 16 during travel of the trailer. As shown in Fig. 10, when the trailer is under a heavy load, or the wheel 16 encounters a bump or other small obstruction in the road, the journal plate 23 pivots upwardly on the pivot point 28 against the bias of the leaf spring 30.

As shown in Fig. 9, the journal plates 23, 23 and the wheels 16 are mounted outboard of the trailer body 15 so that they may be rocked upwardly by the axle 27 above the lowermost extremity of the trailer body to the position shown in Fig. 2. To effect rocking movement of the journal assemblies, a pair of crank levers 33, 33 is provided on the axle 27. In the present instance, each crank 33 is formed integrally with the inboard lever 26. The crank 33 is actuated by the piston 34 of a pressure cylinder 35 which is pivotally mounted on the body 15 as indicated at 36, there being a pressure cylinder 35 and a crank 33 at each side of the trailer body 15. With the axle shaft 27 in its counterclockwise limit position, the wheels being in their upper limit position as shown in Fig. 2, pressure fluid is introduced into the cylinders 35, 35 to extend the pistons 34, 34 and rock the axle shaft 27 clockwise to the position shown in Figs. 1 and 8. Pressure fluid is supplied by a conduit 37 connected to the pressure side 38 of a pump 39 mounted on the articulated draw bar 17. In the present instance, the pump 39 is a manually operated pump, but it is within the scope of the invention to provide an electrically operated pump. When it is desired to raise the wheels 16 relative to the body 15, a release valve 40 on the pump 39 is opened to afford discharge of the pressure fluid from behind the piston 34. The weight of the body 15 effects retraction of the piston 34 at a rate determined by the degree of opening of the valve 40.

The articulated draw bar 17 is connected to the axle 27 to be extended and collapsed in synchronism with lowering and elevation of the wheels 16, 16 relative to the body 15. To this end, the draw bar comprises a forwardly extending brace 42 rigidly secured to the trailer body 15. In the present instance, the brace 42 comprises a triangular member, as shown in Fig. 4 having longitudinally extending reinforcements. A forward link 43 is pivotally mounted at the forward end of the brace 42 as indicated at 44. A rearward link 45 is rigidly mounted on a shaft 46 journalled in the rearward end of the brace 42. The links 43 and 45 are interconnected at their upper ends by a cross piece 47 which, in the present instance, mounts the pump 39. The cross piece 47 is formed with the connector 18 for connecting the draw bar 17 to the trailer hitch 19. It should be noted that the links 43 and 45 are of equal length, as are the brace 42 and the cross piece 47 between the links 43 and 45 so that the four elements form a parallelogram, the brace 42 being parallel to the cross piece 47 throughout the adjustment from the collapsed position shown in Fig. 1 to the extended position shown in Fig. 2.

Referring now to Fig. 6, clockwise rotation of the axle shaft 27 collapses the articulated draw bar 17, and counterclockwise adjustment of the shaft 27 extends the draw bar 17. To afford simultaneous adjustment of the axle shaft 27 and the draw bar 17, the draw bar adjusting shaft 46 is geared for movement with the axle shaft 27, clockwise rotation of the shaft 27 effecting counterclockwise rotation of the shaft 46 and vice versa. In the present instance, the gearing consists of a set of chain lengths 48, 48 secured to the shaft 27, as indicated at 49 and passing over the shaft 27 under the shaft 46 and secured to the latter shaft as indicated at 50. A second set of chain lengths 52, 52 which are connected to the shaft 27 as indicated at 53, pass under the shaft 27 and over the shaft 46, being connected to the latter as indicated at 54. Turnbuckles for the chain length 48 and 52 may be provided as indicated at 55 and 56 respectively to insure proper operation of the gearing. Thus, clockwise rotation of the axle shaft 27 effects counterclockwise rotation of the draw bar adjusting shaft 46. Counterclockwise rotation of the adjusting shaft 46, in turn, effects counterclockwise rotation of the rearward link 45 relative to the brace 42, effecting collapse of the extended draw bar 17. In a similar manner, counterclockwise rotation of the shaft 27 effects clockwise rotation of the shaft 46 and the rearward link 45, causing extension of the collapsed draw bar 17. Thus, when the wheels 16, 16 are lowered relative to the body 15 to adjust the latter upwardly, the draw bar 17 is collapsed to maintain the body 15 level throughout the adjustment. Likewise, when the wheels 16 are raised to adjust the body 15 downwardly, the draw bar 17 is extended to similarly maintain the body 15 horizontal at all times. As shown in Fig. 2, with the body in the lowered position, machinery or livestock may be driven directly into the body over the tailgate. With the load in the body 15, the pump 39 is actuated to extend the piston 34, rotating the shaft 27 clockwise which lowers the wheel relative to the body and collapses the draw bar, thereby raising the body, at the same time maintaining the same substantially horizontal.

To insure against collapse of the body 15 while on the road, for example by reason of failure of the pump 39 to retain pressure behind the piston 34 of the cylinder 35, lock means is provided for the draw bar 17 and the wheel journals 23, 23. The latching means comprises an eye bolt 60 pivotally mounted on the brace 42, as indicated at 61. The eye bolt is threaded at its free extremity to engage a hollow tubular stem 62 of a latch handle 63. The stem 62 is dimensioned to pass through the large end of a key hole slot 64 in the rearward link 45 of the draw bar 17. The small end of the slot 64 is dimensioned to snugly receive the threaded shank of the eye bolt 60 when the draw bar 17 is collapsed. When the draw bar is extended, the body 15 of the trailer being in its lower limit position, the stem 62 of the handle 63 is disposed in the enlarged portion of the key hole slot 64. Raising the body 15 collapses the draw bar 17 and causes the stem 62 to pass upwardly through the slot 64. When the body 15 is in the upper limit position, the lower extremity of the stem 62 is above the slot 64 so that the handle 63 and the eye bolt 60 may be displaced forwardly on the pivot point 61, engaging the threaded shank of the eye bolt 60 in the reduced portion of the key hole slot 64. The stem 62 is then screwed down tight against the link 45, as shown in Fig. 5, to securely latch the draw bar in collapsed position. The lower extremity of the stem 62 is provided with a series of circumferentially spaced detents 66 which are engaged by a set screw 67 on the link 45 to lock the stem 62 against rotation. Thus, forward displacement of the handle 63 and rotation thereof on its axis securely latches the draw bar 17 in collapsed position.

Forward pivotal movement of the handle 63 also latches the wheel journals 23, 23 in their clockwise limit position, although affording resilient suspension thereof, as pointed out above. To this end, the inboard levers 26, 26 are provided with inwardly projecting latch lugs 70, 70. Clockwise movement of the levers 26, 26 passes the lugs 70, 70 between pairs of latch plates 71, 71 which project outwardly from the body 15 of the trailer. The latch plates 71, 71 are provided with registering openings to receive a latch plug 72. The latch plug 72, as shown in Fig. 2, is displaced rearwardly when the latch handle 63 is in its rearward limit position. When the latch handle 63 is displaced to its forward limit position, the latch plug 72 is projected forwardly through the apertures in the latch plates 71, 71 engaging over the latch lug 70 on the arm 26 to latch the latter against counterclockwise movement (see Fig. 12). The latch plug 72 is operated by a crank 73 of a rock shaft 74, which in turn is rocked by a connecting rod 75, connected at its forward extremity to the eye bolt 60, as indicated at 76. A spring bias is provided on the connecting rod 75 as shown at 77 to bias the rod forwardly and assist latching of the latch plug 72 in the latch plates 71, 71. Thus, the levers 26, 26 supporting the wheel journals 23, 23 are rocked in their clockwise limit position simultaneously with the locking of the draw bar 17 in its collapsed position.

In the operation of the trailer, when it arrives at its destination, it is in the position shown in Fig. 1. To lower the trailer body 15 to the ground, the pump 39 is first actuated to insure that full pressure is applied to the cylinders 35, 35, thereby insuring that the wheel journals are in their full clockwise position, and the draw bar 17 is in its fully collapsed position. The latching handle 63 is then unscrewed and pivotally displaced rearwardly against the bias of the spring 77. With the latching lever 63 in its rearward limit position, the valve 40 on the pump 39 is opened to slowly discharge the pressure fluid from the cylinder 35 and allow the wheels 16, 16 to pivot counterclockwise with the shaft 27, thereby allowing the body 15 to settle to the ground. With the body 15 resting on the ground, the tail gate is opened and the load is discharged at ground level. If the first step is omitted and the pressure fluid in the cylinders 35, 35 is insufficient to support the wheels, the latching lug 70 will be firmly engaged against the plug 72, and it will be impossible to displace the latching handle 63 rearwardly. Thus, uncontrolled dropping of the body 15 is effectively prevented. When loading the trailer, the load is placed in the body, the tail gate raised, the pump 39 operated, the latching handle 63 displaced forwardly, the handle 63 is rotated to clamp the stem 62 against the link 45, and the thread screw 67 is locked in place.

While a particular embodiment of the present invention has been herein illustrated and described, it is not intended to limit the invention to such a disclosure, but changes and modifications may be made therein and thereto within the scope of the following claims.

I claim:

1. In a trailer having a load-carrying body, an articulated draw bar mounted on the body comprising four members pivotally connected to form a parallelogram movable between a collapsed and an extended position.

two of said members being maintained substantially horizontal, one of said horizontal members being rigidly mounted on said body, hitch means rigidly mounted on the other of said horizontal members, lever means pivotally mounted on said body, wheels rotatably mounted on said lever means and movable with said lever means between lower and upper limit positions relative to said body, and means interconnecting said draw bar and said lever means for collapsing said draw bar simultaneously with lowering said lever means and for extending said draw bar simultaneously with raising said lever means.

2. A trailer having a load-supporting body movable between upper and lower limit positions, including a draw bar assembly supporting one end of the body and a wheel assembly supporting the other end of said body, said draw bar assembly comprising a substantially horizontal brace rigidly secured to said body, a cross piece disposed above said brace in parallel relation thereto, means for attaching the trailer to a towing vehicle rigidly mounted on said cross piece, a pair of coextensive parallel links, each pivotally mounted at its upper end to said cross piece and at its lower end to said brace to form a collapsible parallelogram, means for pivotally displacing said links to extend and collapse said parallelogram and thereby effect lowering and raising of said brace relative to said cross piece, said wheel assembly comprising a shaft extending transversely of said trailer body, crank lever means on said shaft mounting wheels for rotation about an axis spaced apart from said shaft, and means for rocking said shaft between clockwise and counterclockwise limit positions to displace said axis between lower and upper limit positions.

3. In a trailer, a resilient suspension assembly for a wheel comprising a pair of journal plates rotatably mounting the wheel therebetween, lever means pivotally mounting said plates, spaced stop means on each plate engageable with said lever means and limiting pivotal movement of said plates relative to said lever means within a predetermined angular displacement, and spring means disposed between each plate and said lever means to bias the plate toward said stop means at one limit of said angular displacement.

4. In a trailer, a resilient suspension assembly for a wheel comprising journal means rotatably mounting the wheel, lever means pivotally mounting said journal means, spaced stop means on said journal means engageable with said lever means and limiting pivotal movement of said journal means relative to said lever means within a predetermined angular displacement, and spring means disposed between said journal means and said lever means to bias the journal means toward said stop means at one limit of said angular displacement.

5. In a trailer, a resilient suspension assembly for a wheel comprising a pair of journal plates rotatably mounting the wheel therebetween, lever means pivotally mounting each of said plates, spaced flanges on each plate constituting stop means engageable with said lever means and operable to limit pivotal movement of said plates relative to said lever means within a predetermined angular displacement, and spring means disposed between each plate and said lever means to bias the plate toward one of said flanges at one limit of said angular displacement.

6. In a trailer, a resilient suspension assembly for a wheel comprising a pair of journal plates rotatably mounting the wheel therebetween, lever means pivotally mounting said plates, spaced stop means on each plate engageable with said lever means and limiting pivotal movement of said plates relative to said lever means within a predetermined angular displacement, and leaf springs, each pivotally mounted at one end to one plate and rigidly mounted at the other end on said lever means to bias the plate toward said stop means at one limit of said angular displacement.

7. A trailer according to claim 1 including auxiliary mechanical means locking said draw bar in collapsed position, and auxiliary mechanical means locking said wheel lever means in the lower limit position.

8. A trailer according to claim 7 including actuator means interconnecting said draw bar locking means and lever locking means to effect simultaneous locking of said draw bar in collapsed position and said lever means in lowered position.

9. A trailer according to claim 2 including means gearing said link displacing means to effect simultaneous opposite vertical adjustment of said brace and said wheel axis to thereby maintain said trailer body horizontal.

10. A trailer according to claim 9 including auxiliary mechanical means locking said brace in its upper limit position, auxiliary mechanical means locking said wheel axis in its lower limit position, and means interconnecting said two locking means to effect simultaneous locking of said brace and said wheel axis.

References Cited in the file of this patent
UNITED STATES PATENTS

| | | |
|---|---|---|
| 2,227,762 | Ronning | Jan. 7, 1941 |
| 2,736,568 | Martin | Feb. 28, 1956 |